March 3, 1936.　　　　F. E. MICKADEIT　　　　2,032,998
AIR HEATED VISION STRUCTURE
Filed June 20, 1935　　　3 Sheets-Sheet 1
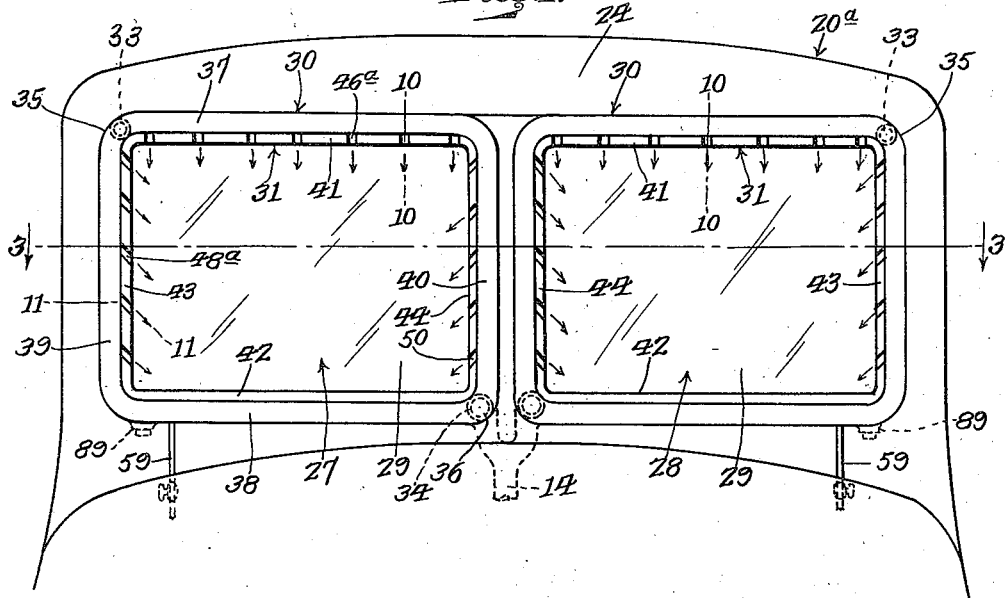
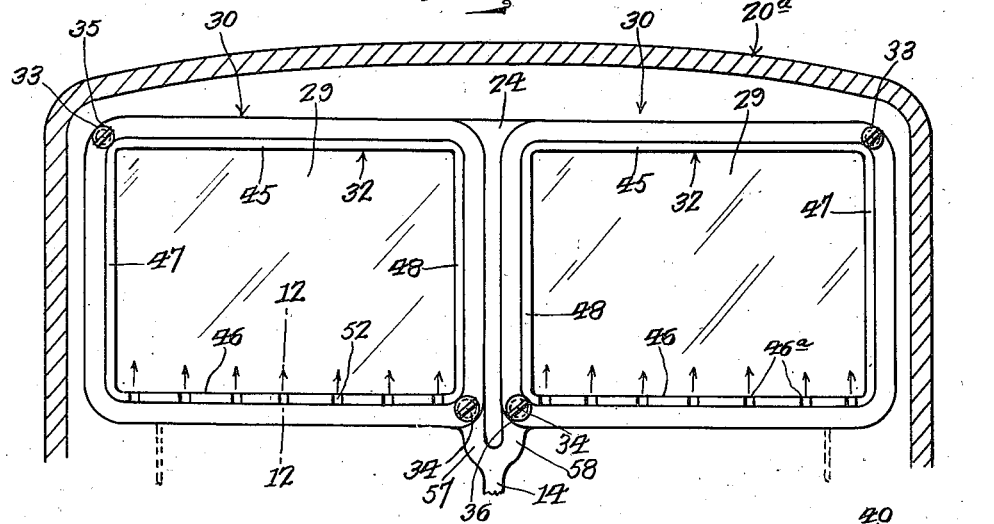
Inventor
Frank E. Mickadeit.
By Geo. P. Kimmel
Attorney March 3, 1936.  F. E. MICKADEIT  2,032,998
AIR HEATED VISION STRUCTURE
Filed June 20, 1935  3 Sheets-Sheet 2

Inventor
Frank E. Mickadeit
By Geo. P. Kimmel
Attorney

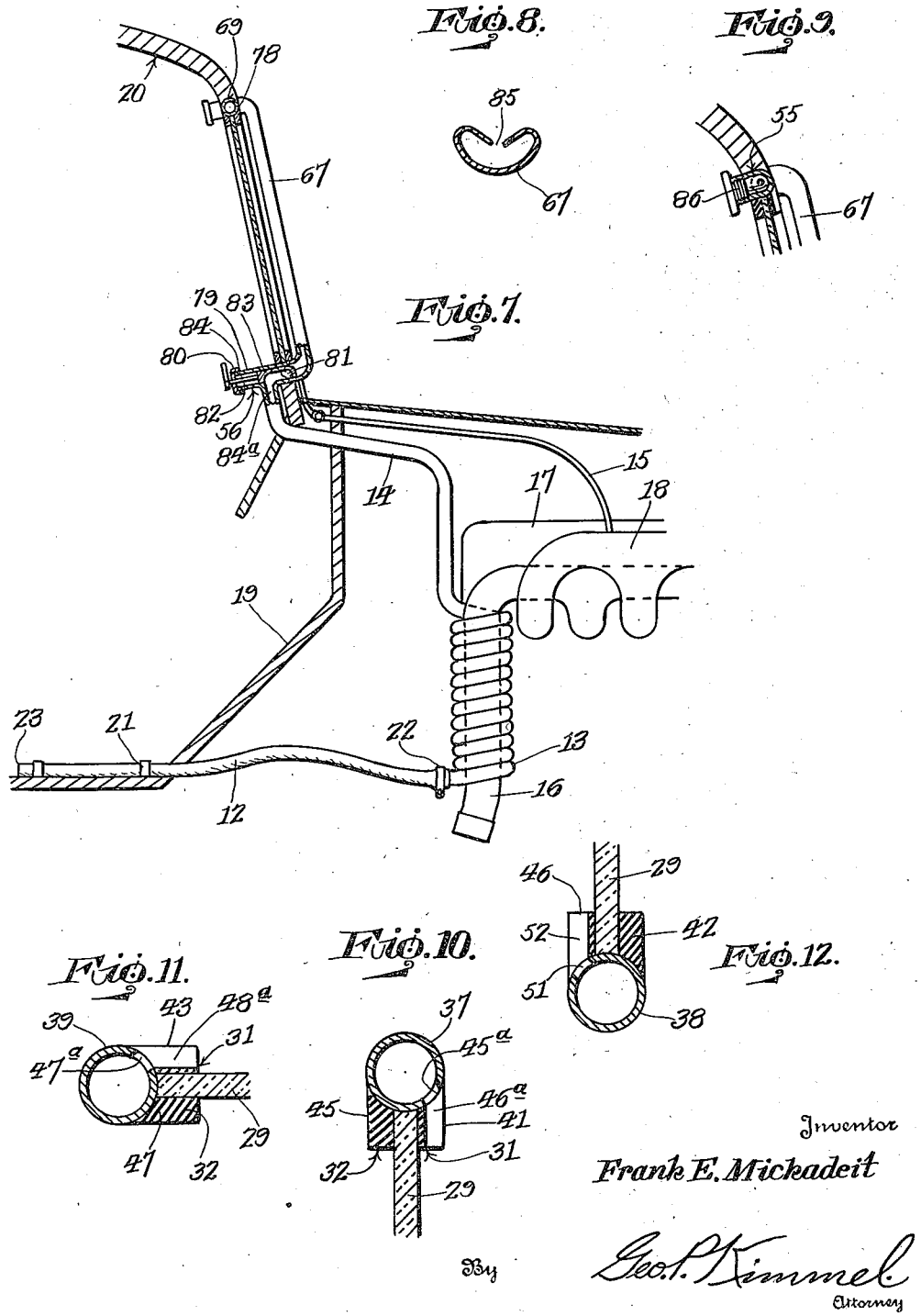

Patented Mar. 3, 1936

2,032,998

UNITED STATES PATENT OFFICE 2,032,998

AIR HEATED VISION STRUCTURE

Frank Edward Mickadeit, Kansas City, Mo., assignor of one-half to Josephine L. Mickadeit, Kansas City, Mo.

Application June 20, 1935, Serial No. 27,586

5 Claims. (Cl. 20—40.5)

This invention relates to an air heated vision structure designed primarily for use as a windshield for automotive vehicles, but it is to be understood that the structure is for employment in any other connection for which it is found applicable, and the invention has for its object to provide, in a manner as hereinafter set forth, a structure of the class referred to for distributing heated air relative thereto for the purpose of eliminating the hazards of ice and snow accumulating thereon and obscuring an operator's vision.

A further object of the invention is to provide, in a manner as hereinafter set forth, a structure of the class referred to including a vision element and means for distributing heated air upon the front and rear faces of said element to prevent the accumulation of frost, ice and snow thereon whereby an operator may have clear vision.

A further object of the invention is to provide, in a manner as hereinafter set forth, a controllable heated vision structure to eliminate the accumulation of frost, ice and snow thereon.

A further object of the invention is to provide, in a manner as hereinafter set forth, a structure of the class referred to including means for distributing heated air at opposite downward inclined directions and at a vertical downward direction upon the outer face of the vision element thereof to prevent the accumulation on the latter of matter which otherwise would impair the vision of an operator.

Further objects of the invention are to provide, in a manner as hereinafter set forth, an air heated vision structure for the purpose referred to which is simple in its construction and arrangement, strong, durable, readily installed with respect to an automotive vehicle, thoroughly efficient in its use, conveniently controlled and inexpensive to set up.

With the foregoing and other objects which may hereinafter appear, the invention consists of the novel construction, combination and arrangement of parts as will be more specifically described and as are illustrated in the accompanying drawings wherein are shown embodiments of the invention, but it is to be understood that changes, variations and modifications may be resorted to which fall within the scope of the invention as claimed.

In the drawings:

Figure 1 is a front elevation of the structure showing the adaptation thereof with a two section windshield.

Figure 2 is a rear elevation of the structure showing the adaptation thereof with a two section windshield.

Figure 3 is a section on line 3—3, Figure 1,

Figure 4:
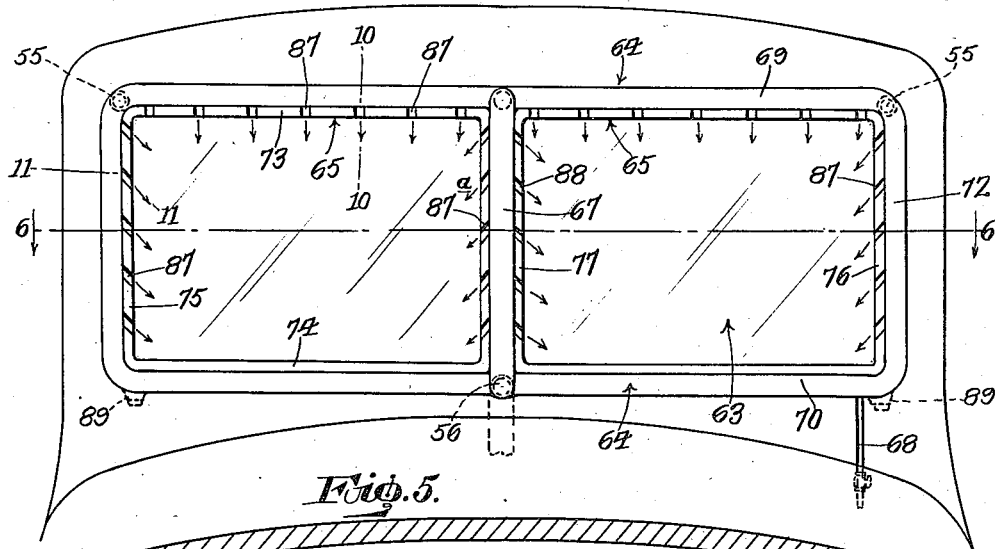
Figure 5:
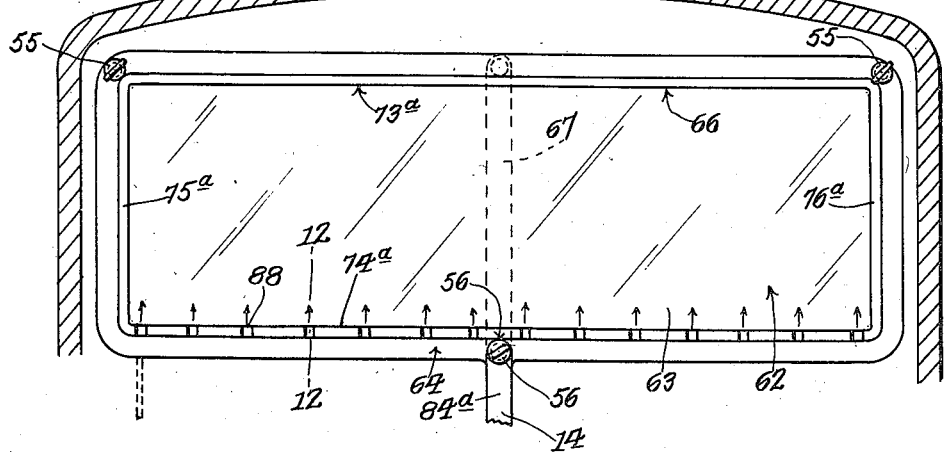
Figure 6:
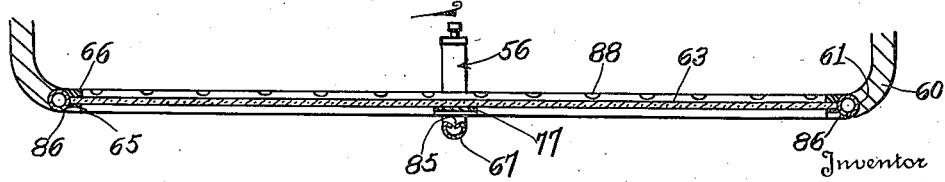

Figure 4 is a front elevation of another form of windshield showing the adaptation therewith of a modified form of air heated vision structure in accordance with this invention, Figure 5 is a rear elevation of the structure shown in Figure 4, Figure 6 is a section on line 6—6, Figure 4, Figure 7 is a fragmentary view in side elevation of an automotive vehicle showing the adaptation therewith of the form of vision structure illustrated by Figures 4, 5 and 6.

Figure 8 is a detail, in cross section and upon an enlarged scale of one of the elements of the form of vision structure shown in Figures 4, 5 and 6, Figure 9 is a sectional detail, upon an enlarged scale illustrating the type of check valve employed in both forms of the invention, Figure 10 is a sectional detail on lines 10—10, Figures 1 and 4, Figure 11 is a sectional detail on lines 11—11, Figures 1 and 4, and Figure 12 is a sectional detail on lines 12—12, Figures 2 and 5.

Both forms of the air heated vision structure include a cool air supply pipe, an air heating coil, a heated air feed pipe and a suction pipe, but the said pipes and coil are illustrated only in connection with that form of the structure which is shown in Figure 7. With reference to Figure 7, the cool air supply pipe is designated 12, the air heating coil 13, the heated air feed pipe at 14 and the suction pipe at 15. The coil 13 encompasses the discharge pipe 16 of the engine 17 of the vehicle. The suction pipe 15 leads from the intake manifold 18 of the engine 17. The pipe 12 is anchored to the body 19 of the vehicle 20, as at 21 and to the bottom of coil 13, as at 22. The pipe 12 extends rearwardly from the bottom of coil 13 and has an intake end 23.

With reference to Figures 1, 2 and 3 the vehicle, designated at 20a has its front 24 formed with a pair of openings 25, 26 which are generally employed to receive the ordinary windshields and there is substituted for the said windshields a pair of vision elements 27, 28 in accordance with this invention which snugly engage the edges of the openings 25, 26 respectively. The said vision elements constitute and function as windshields. The vision elements 27, 28 are oppositely disposed and are of like construction. Each vision element includes a transparent panel 29, a rectangular frame 30 abutting against the edges of the panel 29, a front and a rear rectangular insulating skeleton members 31, 32 respectively arranged in separated parallel relation by the panel 29 abut the faces of the latter and bear against the inner edges of the frame 30, a check valve 33 and a heated air controlling valve 34.

The frame 30 and the members 31, 32 are formed with rounded upper and lower corners. The upper outer corner and the lower inner corner of the frame 30 are designated 35, 36 respectively. The frame 30 is formed of upper, lower, outer and inner tubular stretches 37, 38, 39 and 40 respectively. The member 31 is formed of upper, lower, outer and inner stretches 41, 42, 43 and 44 respectively. The member 32 is formed of upper, lower, outer and inner stretches 45, 46, 47 and 48 respectively. The members 31, 32 are anchored by any suitable means to the panel 29 and frame.

The stretch 37 (Figure 10) of frame 30 is formed outwardly adjacent its longitudinal and below its horizontal median with a series of spaced downwardly inclined openings 45a. The stretch 41 of member 31 (Figures 1 and 10) has its outer face provided with a series of spaced vertically extending grooves 46a which register at their upper end with the openings 45a. The stretch 39 of frame 30 is formed inwardly of its lengthwise and outwardly of its vertical median with a series of spaced downwardly inclined openings 47a. The stretch 43 of member 31 (Figures 1 and 3) is formed in its outer face with a series of spaced inwardly extending downwardly inclined grooves 48a which register at their inner ends with the openings 47a. The stretch 40 of frame 30 is formed inwardly of its lengthwise and outwardly of its vertical median with a series of downwardly inclined openings 49 (Figures 3 and 11). The stretch 44 of member 31 (Figures 1 and 3) is formed in its outer face with a series of spaced inwardly extending downwardly inclined grooves 50 which at their inner ends register with the openings 49. The stretch 38 of frame 30 is formed inwardly adjacent its longitudinal and above its horizontal median with a series of spaced outwardly inclined openings 51 (Figure 12). The stretch 46 of member 32 (Figures 2, 3 and 12) is formed in its outer face with a series of spaced grooves 52 which register with the openings 51. The stretches 37, 38, 39 and 40 constitute heated air conductors surrounding the panel 29. The openings 45, 47 and 49 provide heated air outlets for the stretches 37, 39 and 40. The grooves 46, 48 and 50 provide channels for directing the heated air from openings 46, 48 and 50 upon the outer face of panel 29 from the top and sides of the latter. The openings 51 constitute heated air outlets for the stretch 47. The grooves 52 provide channels for directing the heated air upon the inner face of panel 29 from the bottom of the latter.

Secured to the corner portion 35 of each frame 30 and extending inwardly therefrom is a check valve 33. Secured to the corner portion 36 of each frame 30 is a heated air supply controlling valve 34. The check valves 33 will be of the same construction as the check valve 55 shown in Figures 4 and 9. The valves 34 will be of any suitable form for opening and closing the frames 30 to the pipe 14. Preferably the valves 34 will be somewhat along the lines of the heated air controlling valve 56 shown in Figure 7.

Depending from and opening into the corner portion 36 of one frame 30 below a valve 34 is a heated air intake member 57, and depending from and opening into the corner portion 34 of the other frame 30 below the other valve 34 is a heated air intake member 58. The members 57, 58 merge at their lower end into the upper of the heated air feed pipe 14. Depending from the frames 30 are valved controlled branch pipes 59 which are to be suitably secured to the suction pipe or line 15.

With reference to Figures 4 to 9 the vehicle 20 has its front 60 provided with a single elongated rectangular opening 61 in which is generally mounted the ordinary windshield, but there is substituted for the latter, in the opening 61 a vision element 62 in accordance with this invention. The element 62 functions as a windshield and it includes an elongated rectangular transparent panel 63, a rectangular frame 64 snugly engaging throughout the walls of opening 61 and the edges throughout of panel 63, an outer rectangular skeleton insulating member 65 positioned against the outer face of panel 63 and against the inner edges of frame 64, an inner rectangular skeleton, insulating member 66 positioned against the inner face of panel 63 and bearing against the inner edges of frame 64, a lengthwise split heated air conductor 67, opening into frame 64, a pair of rearwardly extending check valves 55, a heated air supply controlling valve 56, and a valved pipe branch 68 opening into the suction line 15.

The frame 64 includes an upper stretch 69, a lower stretch 70 and a pair of side stretches 71, 72. The stretches are of tubular cross section. The stretch 69 merges into the upper ends of the stretches 71, 72. The stretch 70 merges into the lower ends of the stretches 71, 72. The stretches constitute heated air conductors. The member 65 consists of an upper stretch 73, a lower stretch 74, a pair of side stretches 75, 76 and an intermediate stretch 77 of greater width than stretches 73, 74, 75 and 76. The stretch 77 is disposed at the transverse center of member 65 and merges at its ends into the inner sides of the stretches 73, 74. The stretch 77 is mounted against the outer face of panel 63 at the transverse median of the latter. The member 66 consists of an upper stretch 73a, a lower stretch 74a and a pair of side stretches 75a and 76a.

The conductor 67 is disposed in relation to the transverse center of panel 63, opposes in parallel spaced relation stretch 77, has a tubular upper end 78 which opens into stretch 69 of frame 64 and a tubular extension 79 at its lower end which extends through and projects rearwardly from stretch 70 of frame 69. The rear end of extension 79 is closed by an apertured cap member 80. The extension 79 is formed with diametrically opposed openings 81 (only one shown) which open into the stretch 70 of frame 64. The extension 79 forms a valve chamber 82 for a slide valve 83 having a manually operated stem 84 projecting outwardly through cap member 80. Integral with and depending from extension 79 is a heated air intake member 84a which opens into pipe 14. The valve 83 is for establishing and closing communication simultaneously between stretch 70, conductor 67 and member 84a; for closing the lower end of conductor 67 to member 84a and stretch 70; and for opening communication between member 84a and stretch 70, while at the same time closing the lower end of conductor 67 to stretch 70.

The split 85 of conductor 67 is arranged in the rear side of the latter, extends from tubular upper end 78 to tubular extension 79 of conductor 67 and opposes in spaced relation the forward face of stretch 77 of member 65. Each check valve 55 includes a vented adjustable plug 86. The check valves 55 are interposed between the ends of the stretch 69 and the upper ends of stretches 71, 72 of frame 64.

The stretches 69, 70, 71, 72 of frame 69 are provided with heated air outlets 86 in the same manner as the stretches 37 38, 39 and 40 respectively of a frame 30. The stretches 73, 75 and 76 of the member 65 are provided with grooves 87 in the same manner as the stretches 41, 43 and 44 of a member 31. The stretch 74 of member 65 is of the same form as the stretch 42 of a member 31. The stretch 74a of member 66 is formed with grooves 88 in the same manner as the stretch 46 of a member 32. The stretches 73a, 75a and 76a of the member 66 are of the same form as the stretches 45, 47, 48 respectively of a member 32. The members 65, 66 are arranged relatively to and secured to the panel 63 and frame 64 in the same manner as the members 31, 32 are arranged relatively to and secured to the panels 29 and frame 30.

The stretch 77 of member 65 is formed with a pair of spaced oppositely disposed sets of downwardly inclined grooves providing heated air conducting channels for the air discharged from slit 85 of conductor 67. One set of grooves is designated 87a and the other at 88. The grooves 87a, 88 function in the same manner as the grooves 50 of stretches 44 of the members 31.

The vision elements 27 and 63 are provided with drain means, as indicated at 89.

The stretches 40 of the frames 30 and the conductor 67 which is associated with frame 64, when the transparent element of the vision structures are required to be heated create a draft which places the heated air at the points where it obtains the best results. The members 31, 32, 65, 66 prevent the danger of the transparent elements cracking.

When vision is obscured on outside of windshield and a strong wind blowing cross ways to your direction of travel open check valve on that side which wind strikes and heated air will continue downward and heated air passes over outer face of the transparent panel through the air passages under open check valve. The opening of this check valve will also allow the heated air to continue to bottom pipe and heated air goes upward over surface of the transparent panel drying the inner side. When the vision is obscured only on the inner surface, the controlling valve is set to direct the heated air through the bottom stretch of a frame causing the air to pass over the inner surface of the panel up to check valve. The check valves have small vents whereby some heated air circulates throughout the insulation stretches of the frame regardless of which stretch the heated air enters. By proper manipulation and adjustment of valves the transparent panel can be kept free of moisture, frost or snow regardless of the direction of the wind.

What I claim is:

1. An air heated vision structure of the windshield type comprising a transparent panel, a heated air conducting means encompassing said panel at its edge and constituting a frame therefor, inner and outer skeleton members of insulation positioned against the inner and outer faces of said panel and against the inner edges of said means, said conducting means being formed with downwardly directed and oppositely disposed inwardly directed outlets for heated air, said outer member being provided with grooves associated with said outlets for directing the heated air from said outlets in different directions upon the outer face of said panel, said conducting means being formed with upwardly directed outlets for heated air, said inner member being formed with grooves associated with said upwardly directed outlets for directing the heated air from the latter upwardly upon the inner face of said panel, and a controllable heated air feed means opening into said conducting means.

2. An air heated vision structure of the windshield type comprising a transparent panel, a frame encompassing the edge of said panel and including an upper, a lower and a pair of side stretches of tubular form, said upper and side stretches having their inner sides formed with heated air outlets disposed in close proximity to the outer face of said panel, said lower stretch being formed on its inner side with heated air outlets in close proximity to the inner face of said panel, controllable heated air feeding means for communication with said frame, and spaced check valves located in said frame adjacent to said means.

3. In an air heated vision structure of the windshield type a rectangular transparent panel, a heated air conductor in the form of a rectangular frame encompassing the edges of said panel and being formed with outlets disposed in relation to the top and sides of the outer face and at the bottom of the inner face of said panel, skeleton means positioned against the outer face of said panel, abutting the inner edge of the conductor and being formed with heated air directing grooves registering at their inner ends with the outlets arranged relative to the top and sides of the outer face of said panel, skeleton means abutting the inner edge of the conductor and being formed with heated air directing grooves registering at their inner ends with the outlets arranged relative to the bottom of the inner face of said panel, a valve controlled heated air feed means for said conductor, an upstanding heated air conductor controlled by said valve controlled feed means, opening at its upper end into the top of and communicating at its lower end into the bottom of the said other conductor, said upstanding conductor being formed in its inner side intermediate its end with a split, and a member positioned against the outer face of said panel, merging into the skeleton means on the outer face of said panel, opposing and spaced from the slit of the upstanding conductor and having its outer face formed with a pair of spaced sets of heated air directing grooves.

4. In an air heated structure of the windshield type, a transparent rectangular panel, a valve controlled tubular rectangular heated air conducting element mounted against and disposed in oppositely extended lateral relation with respect to the edges of said panel, said element being formed with heated air outlets directed towards the top and sides of the outer face and heated air outlets directed towards the bottom of the inner face of said panel, means positioned against the outer and inner faces of said panel, encompassed by said element and provided with downwardly directed and inwardly directed oppositely downwardly inclined grooves registering at their inner ends respectively with the outlets directed towards the top and sides of the outer face of said panel, said means being formed with upwardly directed grooves registering at their inner ends with the outlets directed towards the bottom of the inner face of said panel, and a controllable heated air feed means associated with said element.

5. In an air heated structure of the windshield type, a transparent rectangular panel, a valve controlled tubular rectangular heated air conducting element mounted against and disposed in oppositely extended lateral relation with respect to the edges of said panel, said element being formed with heated air outlets directed towards the top and sides of the outer face and heated air outlets directed towards the bottom of the inner face of said panel, means positioned against the outer and inner faces of said panel, encompassed by said element and provided with downwardly directed and inwardly directed oppositely downwardly inclined grooves registering at their inner ends respectively with the outlets directed towards the top and sides of the outer face of said panel, said means being formed with upwardly directed grooves registering at their inner ends with the outlets directed towards the bottom of the inner face of said panel, a controllable heated air feed means associated with said element, an upstanding heated air conductor arranged relatively to said element, opening at one end into the latter and at its other end into said controllable feed means, said conductor being formed intermediate its ends and in its inner side with a slit providing for the outlet of heated air, and a member arranged within the said means on the outer face of the panel, opposing in spaced relation said slit and being formed with a pair of spaced sets of oppositely disposed downwardly inclined grooves directed to opposite portions of the outer face of the panel.

FRANK EDWARD MICKADEIT.